March 4, 1941.   R. R. LAW   2,233,786
FLUORESCENT SCREEN ASSEMBLY AND METHOD OF MANUFACTURE
Filed Nov. 29, 1939
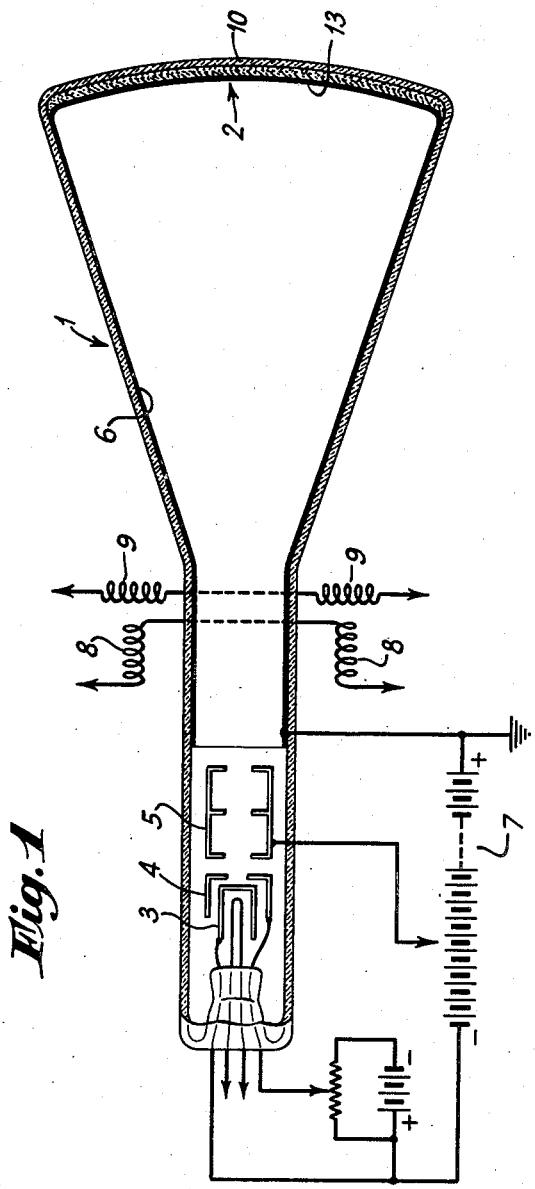
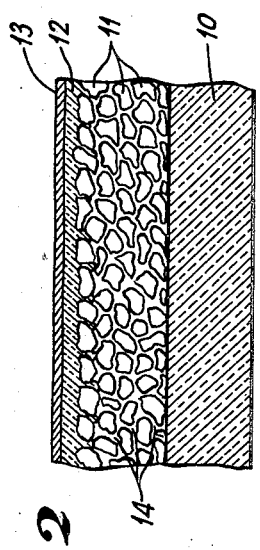
INVENTOR.
RUSSELL R. LAW
BY
ATTORNEY.

Patented Mar. 4, 1941

2,233,786

UNITED STATES PATENT OFFICE 2,233,786

FLUORESCENT SCREEN ASSEMBLY AND METHOD OF MANUFACTURE

Russell R. Law, Chatham, N. J., assignor to Radio Corporation of America, a corporation of Delaware Application November 29, 1939, Serial No. 306,621

8 Claims. (Cl. 250—80)

My invention relates to cathode ray tubes of the type having fluorescent phosphor screens, and a method of making such screens.

In cathode ray tubes of the indirect viewing type the luminescent material or phosphor is deposited as a layer of finely divided particles on a portion of the inner surface of a glass envelope and the light image formed in the phosphor is viewed indirectly through the luminescent material. Since the luminous energy or light flux generated by the phosphor is uniformly scattered in all directions, only approximately one half the light flux is available for use and inasmuch as the phosphor is not electrically conducting, the upper limit of satisfactory high voltage operation depends upon the secondary emission characteristics of the phosphor.

It is an object of my invention to provide a fluorescent phosphor screen for use in cathode ray tubes of the indirect viewing type wherein substantially all of the light flux may be utilized. It is a further object of my invention to provide a phosphor screen which may be operated at a high potential irrespective of its secondary electron emitting properties. It is a further object to provide a method of manufacturing a fluorescent screen having the desired luminous and electrical properties.

In accordance with my invention, I provide on a transparent foundation a fluorescent screen of a finely divided phosphor, the screen being coated with an electron pervious and substantially light transparent medium or layer so that the interstices or voids between the particles at the exposed surface of the phosphor are filled with the medium to provide a substantially smooth surface on that side of the layer opposite the side in contact with the fluorescent material. I then deposit on the smooth surface of the electron pervious and substantially light transparent layer a metallic film thick enough to be light reflecting and thin enough to be pervious to high velocity electrons, thus forming a screen assembly. Further in accordance with my invention, I provide a method of fabricating the screen assembly which includes maintaining an electrostatic field across the foundation and the fluorescent screen assembly to provide good adhesive contact between the fluorescent screen and the foundation during fabrication and treatment of the screen assembly.

These and other objects, features and advantages of my invention will appear from the following description taken in connection with the accompanying drawing in which:

Fig. 1 is a diagrammatic view of a cathode ray tube incorporating my invention and Fig. 2 is a greatly enlarged cross-sectional view of a portion of the screen structure shown in Fig. 1.

In the illustrative embodiment of my invention shown in Fig. 1, the tube comprises a highly evacuated glass envelope or bulb 1 with a tubular arm or neck section enclosing the conventional type electron gun and a frusto-conical section closed by a transparent wall at the end remote from the gun structure and provided with a fluorescent screen assembly or target 2 adapted to be rendered luminescent under the impact of the electron beam.

The electron gun assembly in the neck section of the bulb 1 is of the conventional type and comprises a cathode 3 from which an electron stream may be drawn, a control electrode 4 connected to the usual biasing battery, and a first anode 5 maintained positive with respect to the cathode 3. The electrons emitted from the cathode 3 are directed through the first anode 5 and concentrated into an electron scanning beam focused on the surface of the target 2 by a second anode 6 which is preferably a conductive coating on the inner surface of the neck section extending between the first anode 5 and the fluorescent screen assembly 2. The first anode 5 and the second anode 6 are maintained at the desired positive potentials with respect to the cathode 3 by a battery 7.

The electron beam from the electron gun may be modulated in intensity by applying a signal between the cathode 3 and the control electrode 4, as well known in the art, and this beam may be deflected over the fluorescent screen 2 by use of conventional deflection coils 8 and 9. It is obvious that electrostatic deflection plates may be substituted for the coils if desired.

In accordance with my invention and as best shown in Fig. 2, I deposit upon the surface of the envelope opposite the electron gun, such as on the transparent wall or base 10, a layer or coating of finely divided fluorescent material 11. Directly on this coating of fluorescent material I deposit an electron pervious and substantially light transparent film 12, and further, I deposit on this film 12 an electron pervious electrically conducting metal film 13 of sufficient thickness to be opaque to light and light reflecting.

The fluorescent material 11 may be of any desired composition such as zinc silicate or a mixture of silicates and/or sulphides, the choice of the material or materials depending upon the particular application for which the tube is to be used. This material may be sprayed, settled, dusted or otherwise applied to the wall 10 either with or without the use of an intermediate volatile binder, although I have found a binder including nitrocellulose mixed with the finely divided fluorescent material to possess certain advantages when the material is to be sprayed on the wall 10. Fluorescent screens of this type are characterized in that they have a rough surface exposed to the electron gun, and I have found that it is substantially impossible to provide such a screen with a smooth surface because of the finite particle size of the fluorescent material. This rough surface is shown in the greatly enlarged sectional view in Fig. 2. The thickness of the screen of fluorescent material 11 is determined by the velocity with which the electrons from the electron gun impinge thereon, and since my screen assembly is of primary use in tubes of the high voltage type wherein the velocity of the electron beam is determined by a second anode potential of 3,000 volts or over, I prefer to make the screen relatively thick so that substantially all of the electron energy is absorbed in producing useful light. I have found that screens having a thickness which allows a white light transmission of 10–15% are suitable for use with second anode potentials of 30,000–50,000 volts and that for velocities above this value a thicker screen is preferable, such as a thickness giving a white light transmission of 10% or less.

Following the application of the screen to the foundation or wall 10, I provide a thin layer or film 12 of electron pervious light transparent material of sufficient thickness to fill the spaces between the particles of the fluorescent material and of sufficient thickness to be substantially smooth on the exposed surface opposite the fluorescent material. I preferably provide this film by evaporating the material from a source exposed to the fluorescent screen, allowing the material to deposit thereon and build up to a sufficient thickness. More particularly, the material of which the film 12 is composed may be lithium fluoride, boric oxide or other transparent compound which is stable at the bake-out temperatures of the tube, usually 400–500° C., stable under high velocity electron bombardment and pervious to electrons. The material to be evaporated is deposited upon a filament of refractory material such as tungsten which may be heated to the vaporizing temperature of the material to be deposited. The filament is supported within the envelope 1 after the fluorescent material has been applied and in a position exposed to the fluorescent material. The envelope 1 is then evacuated and the filament heated to vaporize the lithium fluoride, boric oxide or other suitable material while maintaining the envelope at room temperature. Suitable shields or masks may be inserted within the frusto-conical section to prevent the deposition of the material on this portion of the bulb wall. I have found that sufficient material may be deposited on the fluorescent material 11 to provide a film 12 of approximately $10^{-5}$ inches in thickness and that this thickness is sufficient to fill the voids between the particles of fluorescent material when these particles have a grain size ranging between ¼ and 10 microns, but the thickness of this film may be decreased when using particles in the lower portion of this size range or it may be further increased in thickness for larger particles. The material of the film 12 fills only the voids between the surface particles of the fluorescent material, and this is of considerable advantage since the electrons may pass unimpeded through the voids, such as the voids 14, in the under layers of the fluorescent material. Thus the penetration of the film 12 below the exposed surface of the phosphor is only 3 to 5% of the thickness of the screen, leaving 95% of the screen thickness with the voids between the particles unfilled. While I have indicated above that the film 12 has an exposed surface which is substantially smooth, it is understood that this surface is relatively smooth with respect to the rough surface of the screen 11. Thus for small particles of the phosphor the exposed surface of the film 12 will be much smoother than with coarser particles, but in all cases the exposed surface of the film 12 is smoother than the adjacent layer of the phosphor.

Following the application of the film 12, I similarly deposit, preferably by a vaporization process, the metal film 13 directly upon the substantially smooth surface of the film 12. The metal may be evaporated from a second filament adjacent the filament from which the lithium fluoride or boric oxide is evaporated, although air may be admitted to the tube following the application of the film 12 to the fluorescent screen, whereupon the first filament may be removed from the tube and replaced with another filament coated with or supporting the metal to be evaporated upon the film 12 to form the metal film 13. A number of metals, such as aluminum, beryllium or magnesium may be used for the metal film 13, although I prefer to use aluminum because it offers very little resistance to the passage of electrons, even when sufficiently thick to be light reflecting. In addition, aluminum is preferable because it does not attack the phosphor. The metal film 13 is made just sufficiently thick as to be opaque to light, and I have found a thickness of $10^{-5}$ inches sufficient for this purpose. In the application of the metal film 13 it is not necessary to use the masks referred to above to prevent deposition of the evaporated metal upon the frusto-conical section of the tube because it is desirable that this metal film cover a portion of the frusto-conical section adjacent the wall 10 so that the second anode 6 of conductive material which is subsequently applied may be in overlapping relation and electrically connected to the metal film 13. If desired, the metal which condenses on the frusto-conical section may form all or a portion of the second anode 6.

Following the completion of the fluorescent screen assembly, which includes the fluorescent material 11 on the end wall 10 and the films 12 and 13, an electrically conductive material such as deflocculated graphite, normally referred to by the trade name "Aquadag" is deposited on the frusto-conical section and a portion of the neck section of the envelope 1 to form the second anode 6, following which the electron gun may be sealed in the neck section and the envelope 1 again evacuated.

During this final evacuation process it is necessary to heat or bake the screen assembly to degasify the entire structure, and because of the differences in the coefficients of expansion of the films 12 and 13 and the rigid end wall 10, the fluorescent material 11 may become detached from the end wall 10. Therefore, in accordance with one teaching of my invention and during the baking step above referred to, I impress a difference of potential of considerable magnitude across the end wall 10 and fluorescent screen assembly to generate a uni-directional electrostatic field which causes the screen assembly to adhere more firmly to the end wall 10 during the time or times when detachment may occur. Preferably, the electrostatic field is constantly maintained during the baking and during the cooling of the screen assembly to room temperature. To generate this electrostatic field I provide a dish-shaped electrode having a surface conforming with the outer surface of the end wall 10. A high difference of potential is maintained between this dish-shaped electrode and the second anode 6, such as a potential of 10,000–15,000 volts which is maintained during the baking of the tube. By virtue of the electrostatic forces generated by this difference of potential, intimate contact is maintained between the fluorescent material 11 and the end wall 10, notwithstanding relatively large differences in the coefficients of expansion which may exist between the materials comprising the end wall 10 and the films 12 and 13.

While I do not wish to be limited to explain the improved operating characteristics of a high voltage cathode ray tube incorporating my invention, it seems probable that the intermediate film of light transparent electron pervious material provides a substantially smooth foundation on which the metal film may be deposited. Fluorescent screens provided with a metal film directly in contact with the screen have a grayish or dark appearance which I believe due to absorption of light by the metallic film. Thus if the metal is evaporated directly on the phosphor, I believe that it permeates the voids near the surface, and these voids may be sufficiently narrow that the metallic layer is not sufficiently thick to be reflecting. Instead, these thin metallic projections both transmit and absorb as well as reflect the light. It is the absorption component which is detrimental. If the narrow voids adjacent the exposed surface of the fluorescent material are first filled by the transparent film 12, the subsequent metallic layer cannot permeate the phosphor in this manner, and although the surface may be by no means smooth as measured in terms of specular reflection, there are no thin isolated metallic projections into the phosphor which might transmit and absorb the light flux. However, since the material forming the film 12 is not mixed with the phosphor but rather is deposited only on the surface to fill the surface voids, there are left the voids between the particles of fluorescent material in the under layers so that there is no absorption of the electron energy except by the particles themselves, thus resulting in an increase of the screen efficiency. In my improved screen substantially all of the light flux may be utilized while, at the same time, the fluorescent screen may be operated at a high positive potential with respect to the cathode, irrespective of its secondary electron emitting properties because the film 12 of electron pervious light transparent material acts as though it were a conductor and the fluorescent material is maintained at second anode potential by the metal film 13 during operation of the tube.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

I claim:

1. A fluorescent screen assembly comprising a light transparent foundation, a coating of finely divided fluorescent particles on said foundation the particles being separated one from another by voids in the coating, a thin electron pervious metallic film adjacent said coating, and an intermediate film supported by said coating filling only a small proportion of said voids, and having a substantially smooth surface in contact with said metal film, said coating consisting of boric oxide of such thickness as to be light transparent and electron pervious between said coating and said metallic film.

2. A fluorescent screen assembly adapted to liberate light when subjected to electron bombardment comprising a thin film of electron pervious light transparent material, a coating of finely divided particles of fluorescent material having voids between the particles on one side of said film and a metallic film of sufficient thickness to be opaque to light and of insufficient thickness to be opaque to electrons on the opposite side of said film, the surface of said film adjacent the metallic film being smoother than the surface of said film adjacent the fluorescent material.

3. A fluorescent screen assembly including a glass base, a relatively thick coating on said base consisting of finely divided particles of fluorescent material having voids between the particles, a film of electron pervious light transparent material on the surface of said coating opposite said base, said film extending below the surface of said coating approximately 5% of the thickness of said coating, leaving voids between the particles between said film and said base, and an electron pervious aluminum film on said film of electron pervious light transparent material.

4. A fluorescent screen assembly including a light transparent base, a coating on said base consisting of a plurality of layers of finely divided particles of fluorescent material having voids between the particles, a film of boric oxide of such thickness that it is electron pervious and light transparent on the exposed surface of said coating opposite the base, said film extending laterally of the exposed layer of fluorescent material and within the voids between the particles adjacent said film, and an electron pervious aluminum film on said film of electron pervious light transparent material.

5. The method of forming a fluorescent screen assembly which includes the steps of coating a light transparent base with finely divided particles of fluorescent material, applying a thin light transparent film of material on the exposed surface of said fluorescent material to fill the voids between the exposed particles, applying an electron pervious metal film on said light transparent film, subjecting said fluorescent material, and said films to a uni-directional electrostatic field to maintain good contact between said material and said base and baking said base and said films while constantly maintaining said electrostatic field at a constant value.

6. The method of maintaining contact between a rigid base and a fluorescent screen assembly including a metal film of sufficient thickness to expand and contract when subjected to relatively large temperature variations, comprising the steps of subjecting the base and the screen assembly to a strong uni-directional electrostatic field, baking the said screen assembly and base to remove occluded gas therefrom and constantly maintaining said field at a sufficiently constant value to prevent detachment of said screen assembly from said base while baking said screen assembly and said base.

7. The method claimed in claim 5 including the additional steps of cooling said base to room temperature after baking, and constantly maintaining said field at a substantially constant value until the base has cooled approximately to room temperature.

8. A fluorescent screen assembly comprising a light transmitting foundation, a coating of individual particles of fluorescent material on one side of said foundation, the surface of said coating opposite said foundation being rough due to the finite size of said particles, a separately applied film of light transparent electron pervious material on and supported by said coating and an electron pervious light opaque and reflecting metal film on said light transparent and electron pervious film, said metal film being out of contact with said particles, and the boundary between the light transparent electron pervious material and the metal film, being a smoother surface than the boundary between the fluorescent material and said light transparent electron pervious material.

RUSSELL R. LAW.